United States Patent [19]

Sugiyama et al.

[11] Patent Number: 4,733,300
[45] Date of Patent: Mar. 22, 1988

[54] CONTOUR SIGNAL CORRECTION CIRCUIT FOR TELEVISION RECEIVER

[75] Inventors: Masato Sugiyama; Isao Nakagawa; Shigeru Hirahata; Kenji Katsumata, all of Yokohama; Sunao Suzuki, Kamakura, all of Japan

[73] Assignee: Hitachi, Ltd., Tokyo, Japan

[21] Appl. No.: 938,962

[22] Filed: Dec. 8, 1986

[30] Foreign Application Priority Data

Dec. 9, 1985 [JP] Japan .................. 60-274942

[51] Int. Cl.$^4$ .............. H04N 7/01; H04N 5/14; H04N 5/44
[52] U.S. Cl. ................... 358/140; 358/166; 358/96; 358/188
[58] Field of Search ............ 358/140, 166, 167, 181, 358/188, 96, 105

[56] References Cited

U.S. PATENT DOCUMENTS 4,677,461  6/1987  Mizutani et al. ............ 358/166
4,683,497  7/1987  Mehyardt ................... 358/166

Primary Examiner—Howard W. Britton
Assistant Examiner—John K. Peng
Attorney, Agent, or Firm—Antonelli, Terry & Wands

[57] ABSTRACT

In combination, a signal processing circuit for television signals includes a contour signal correction circuit for use in a television receiver and a scanning line interpolation circuit for converting a television signal of a signal structure for interlaced scanning into a television signal for sequential scanning.

3 Claims, 6 Drawing Figures

CONTOUR SIGNAL CORRECTION CIRCUIT FOR TELEVISION RECEIVER

BACKGROUND OF THE INVENTION

The present invention relates to a signal processing circuit for television signals and more particularly to a contour signal correction circuit for the television signal used in a television receiver receiving the television signal for interlaced scanning and converting the same to the signal for sequential (non-interlaced) scanning.

The interlaced scanning used in the NTSC television system eliminates a flicker phenomenon to be produced on the screen of the picture tube without requiring so wide a bandwidth for its television signals and without deterioruting the reproducibility of movement in the picture image so much.

But, due to the interlaced scanning, there is sometimes produced a scanning line flicker in the ruster on the Faceplate of the picture tube or a course striped structure of the scanned lines are observed, and thereby, the picture image reproduced on the Faceplate is deteriorated. It is well known that an image corresponding to the total number of the scanned lines is not reproduced in the human visual sensation but only that corresponding to 60-70% of the actual number of the scanned lines is sensed by the eyesight (refer, for example, to a report entitled "Screen and Scanning Arrangements for High Quality Television", Monthly Journal of NHK Technical Laboratory, Nov. 1981).

Against this, a device to avoid the above described deterioration in the picture image is known, which, in a television receiver, generates an auxiliary signal through production of an image signal between two adjacent scanning lines by interpolation and displays the image from the signal in between the adjacent scanning lines. For example, in the case of a circuit described in Japanese Paten Laid-open No. 58-77373/1983, movement of the picture image included in the video signal is detected, and the interpolation signal is produced from signals of a plurality of different fields when movement of the picture image is small, and the interpolation signal is produced from the signals within one field when movement of the picture image is large, and thus the circuit is enabled to make processing in a movement responsive manner. Through such processing, an interpolation signal to improve the resolution is generated for a still picture, while an interpolation signal which does not produce such deterioration in the picture image as blurring is generated for a moving picture, and thereby, an interlaced scanning signal is converted into a sequential scanning signal.

In a television receiver, there is in general provided a circuit for correcting the signal of the contour portion of the luminance signal. In the apparatus described in Japanese Patent Laid-open No. 60-19356/1985, for example, a composite color video signal for 2:1 interlaced scanning is converted into a digital signal, and then, the signal, in the first place, is converted into that for sequential scanning through a circuit for converting to sequential scanning. Separated from this digitized composite color video signal by means of a comb filter, a signal component including the vertical contour signal is obtained. And then, from the same, the chrominance signal component is removed by means of a low pass filter, and thus, the vertical contour signal is enabled to be obtained.

In the above described prior art, the received 2:1 interlaced scanning signal is first converted into a sequential scanning signal. While the frame frequency of the interlaced scanning signal is 30 Hz, the frame frequency of the sequential scanning signal is 60 Hz. It therefore follows that the circuit processing the sequential scanning signal must make the contour correction with the signal the operating speed therefor is doubled.

If the sampling frequency for converting the video signal to the digital signal is made to be four times the fsc (the fsc is the color subcarrier frequency of approximately 3.58 MHz), then this frequency becomes approximately 14 MHz, and therefore, the line memory to be used as the delay circuit and the contour detector circuit must be that functioning at approximately 28 MHz.

SUMMARY OF THE INVENTION

A primary object of the present invention is to solve the above described problems and provide a contour signal correction circuit for the sequential scanning signal which will be constructed of circuits operating at lower speed and will be incorporated with the scanning line interpolation circuit of a movement responsive type.

According to the present invention, the contour correction circuit, which receives an input of a television signal for interlaced scanning, consists of a scanning line interpolation circuit for producing an interpolated scanning line signal from the input signal, two—a first and a second—contour signal correction circuits performing contour correction processing for the received scanning line signal and the interpolated scanning line signal, respectively, and speed doubling circuits for converting the output signals from the first and second contour signal correction circuits into the sequential scanning signals.

The scanning line interpolation circuit receives the television signal for interlaced scanning us the input signal and outputs the signal for producing the interpolated scanning line. At this time, the scanning line interpolation circuit makes the interpolation processing using the signal of a different field when the movement of the picture image is small, while it makes the interpolation processing using signals within one field when the movement of the picture image is large, and thus, the interpolated scanning line signal is produced.

The first contour correction circuit makes the contour correction processing for the actual scanning line signal.

The second contour correction circuit makes the contour correction processing for the interpolated scanning line signal. At this time, the contour correction signal for the interpolated scanning line signal is supplied from the scanning line interpolation circuit.

The speed doubling circuits are supplied with each of the signals output from the first and second contour correction circuits, and these speed doubling circuits, after compressing the lime base of the supplied two signals to ½, alternately output the two signals with time base compressed, by means of switching, at intervals of one horizontal scanning period of the sequential scanning signal, and thus the sequential scanning signal is delivered. One horizontal scanning period with the sequential scanning is ½ of one horizontal scanning period with the interlaced scanning.

DETAILED DESCRIPTION OF THE PREFERRED EMBODIMENTS

An embodiment of a contour signal correction circuit of the present invention will be described below with reference to FIGS. 1 and 2.

Figure 1:
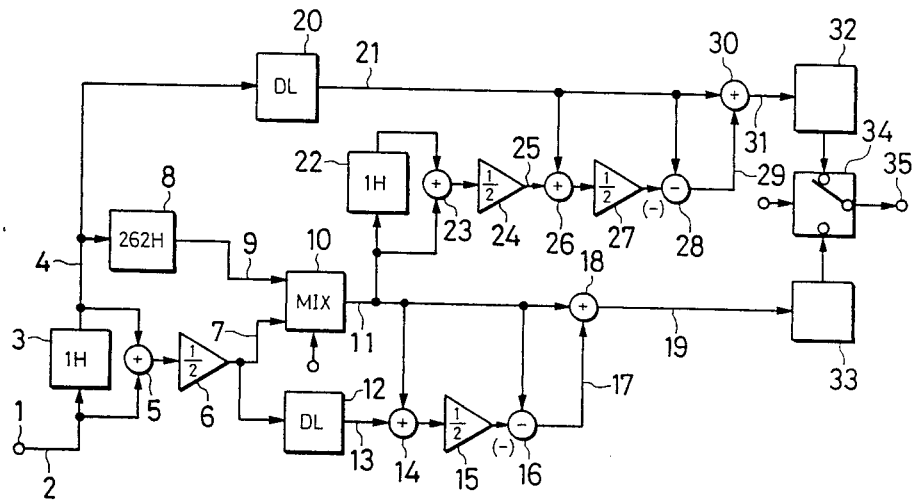
FIG. 1 is a block diagram showing a first embodiment of a contour signal correction circuit of the present invention.

Referring to FIG. 1, the contour signal correction circuit of the present invention is made up of an input terminal 1, line memories 3 and 22, adder circuits 5, 14, 18, 23, 26, and 30, ½-time coefficient circuits 6, 15, 24, and 27, a field memory 8, a mixer circuit 10, delay circuits 12 and 20, subtractor circuits 16 and 28, time base compressor circuits 32 and 33, a switching circuit 34, and an output terminal 35.

First, a circuit producing an interpolated scanning line signal will be described. The interlaced scanning lines, when the time is taken along the axis of abscissas and the positions in the vertical direction on the picture tube are taken along the axis of ordinates, are expressed as shown in FIG. 2. A circular mark in FIG. 2 indicates an original scanning line in the interlaced scanning system.

Figure 2:
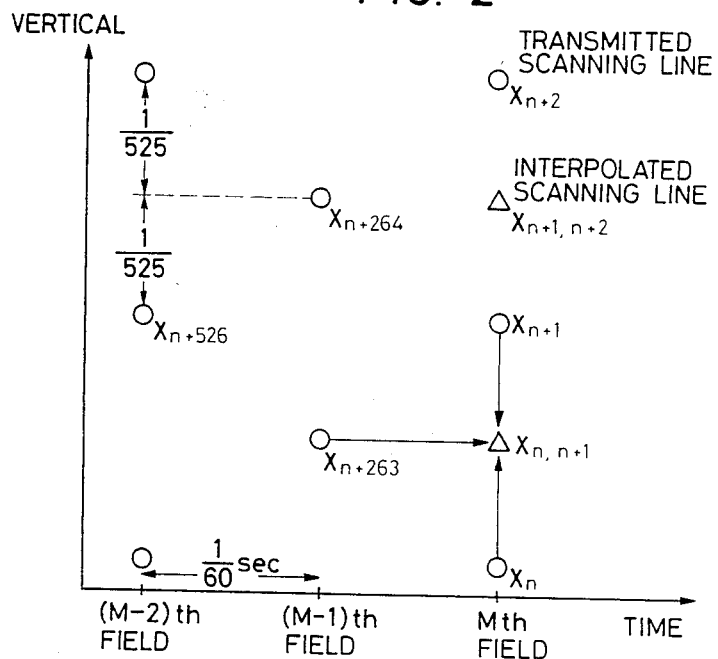
FIG. 2 is a schematic diagram for explanation of scanning line interpolation and contour correction.

In order to convert the interlaced scanning signal into a sequential scanning signal, an interpolated scanning line signal as indicated by a triangular mark in FIG. 2 is produced. As apparent from FIG. 2, the positions of the interpolated scanning lines in the M-th field, (Xn,n+1) and (Xn+1, n+2), are coincide with the positions of the scanning lines a one-field period before, i.e., those in the (M−1)-th field, (Xn+263) and (Xn+264). Therefore, in the case of a still picture image, the signals for the scanning lines a one-field period before, (Xn+263) and (Xn+264), are used as the signals for the interpolated scanning lines, (Xn, n+1) and (Xn+1, n+2). However, if such a video signal in the (M−1)-th field is used as the interpolation signal in the case of a moving picture image, it means that a signal in the field 1/60 second apart is used, and so, deterioration in the quality of the picture such as a blurring of the image is produced. Therefore, in the case of the moving picture image, video signals for a plurality of scanning lines within the M-th field only are used so that the signal for the interpolated scanning line is produced from within the field. More concretely, the signal for the scanning line, (Xn, n+1), is obtained from the average value of the signals for the consecutive two scanning lines, (Xn) and (Xn+1). And the signal for the scanning line, (Xn+1, n+2), is obtained from the average value of the signals for the scanning lines (Xn+1) and (Xn+2).

As shown in FIG. 1, the 2:1 interlaced scanning input signal (Xn) 2 of the digitized video signal input from the input terminal 1 is supplied to the line memory 3 for 1 H (, where 1 H is a horizontal scanning period in the interlaced scanning system). The line memory 3 produces an H delayed signal (Xn+1) 4. The H delayed signal 4 and the input signal 2 are input to the adder circuit 5 to be added together therein, and the data of the amplitude of the added signal is subjected to multiplication by ½ in the coefficient circuit 6. The output signal 7 of the coefficient circuit 6 is an interpolated signal within the field.

The 1 H delayed signal 4 is also input to a field memory 8 whose delay time is 262 H and the field memory 8 produces an interpolation signal 9 obtained from the scanning line (Xn+263), which is a one-field period apart.

The above mentioned interpolated signal 7 obtained from the signals within the same field and the interpolation signal 9 obtained from the signal of the different field are input to the mixer circuit 10 to be mixed. The mixing ratio of these two input signals is adjusted according to the degree of movement of the picture image before being output. The ratio of mixture is controlled so that, when the degree of movement of the picture image is smaller, the mixing ratio of the interpolation signal 9 obtained from the different field becomes larger, and when the degree of movement of the picture image is larger, the mixing ratio of the interpolated signal 7 obtained from the signals within the same field becomes larger.

In the described manner, an interpolated scanning line signal 11 before contour correction is obtained. On the other hand, the 1 H delayed signal 4 is input to the delay circuit 20, and in this delay circuit 20, an actual scanning line signal 21 before contour correction is obtained. The delay circuit 20 is used for bringing the interpolated scanning line signal 11 and the actual scanning line signal 21 concurrent in timing. The delay time in the delay circuit 20 is selected to be equal to the delay time for the signal in the mixer circuit 10.

The correction processing of the contour signal is carried out using three consecutive scanning line signals in the sequential scanning. In the processing, the present invention performs the contour signal correction processing in parallel for each of the interpolated scanning line and the actual scanning line. Therefore, it is not necessary to increase the processing speed.

The contour correction for the interpolated scanning line signal 11 is carried out as follows using the original scanning line signals Xn and Xn+1 and the interpolated scanning line signal Xn, n+1.

The interpolated signal 7 of the signals within the same field is the average value of the signals for the scanning lines Xn and Xn+1. This signal is input to the delay circuit 12 and turned into a contour correction signal 13 for the interpolated scanning line signal 11. The delay circuit 12 is used for bringing the interpolated scanning line signal 11 and the contour correction signal 13 concurrent in timing, and the delay time thereof is selected to be equal to the delay time in the mixer circuit 10. Incidentally, the delay circuits 12 and 20 are not required if the delay time in the mixer circuit 10 is sufficiently short.

The contour correction signal 13 and the interpolated scanning line signal 11 are input to the adder circuit 14 wherein the sum of both the signals is obtained. The added signal, after its amplitude data has been multiplied by ½ in the coefficient circuit 15, is supplied to the subtractor circuit 16. The ½-multiplied signal is subtracted from the interpolated scanning line signal 11 in the subtractor circuit 16 and a contour component signal 17 is thereby obtained. The contour component signal 17 is supplied to the adder circuit 18 and added to the interpolated scanning line signal 11, and in this adder circuit 18 is obtained an interpolated and contour corrected scanning line signal 19.

The interpolated and contour corrected scanning line signal 19 is expressed as:

$$X_{n,n+1}+[X_{n,n+1}-\frac{1}{2}\{X_{n,n+1}+\frac{1}{2}(X_n+X_{n+1})\}]$$
$$=-\frac{1}{4}X_n+3/2X_{n,n+1}-\frac{1}{4}X_{n+1}.$$

On the other hand, contour correction for the actual scanning line signal 21 is performed in the following way using the original scanning line signal $X_{n+1}$ and scanning line signals obtained by interpolation, $X_{n,n+1}$ and $X_{n+1, n+2}$.

The interpolated scanning line signal ($X_n, n+1$) 11 and a signal obtained from the same delayed by a 1 H period by the line memory 22, ($X_{n+1}, n+2$), are added together in the adder circuit 23, and the amplitude data of the added signal is multiplied by ½ in the coefficient circuit 24. The added and 2/1-multiplied signal becomes the contour correction signal 25 for the received scanning line signal 21.

The contour correction signal 25 and the actual scanning line signal 21 are input to the adder circuit 26, and in this adder circuit 26, the sum of the signals is obtained. The added signal in the adder circuit 26, after its amplitude data has been multiplied by ½ in the coefficient circuit 27, is supplied to the subtractor circuit 28. The output signal of the coefficient circuit 27 is subtracted from the scanning line signal 21 in the subtractor circuit 28 and a contour component signal 29 is obtained in the subtractor circuit 28. This contour component signal 29 is added to the actual scanning line signal 21 in the adder circuit 30, and thereby, a contour corrected actual scanning line signal 31 is obtained in the adder circuit 30.

The contour corrected scanning line signal 31 is expressed as:

$$X_{n+1}+[X_{n+1}-\frac{1}{2}\{X_{n+1}+\frac{1}{2}(X_{n,n+1}+X_{n+1,n+2})\}]=-\frac{1}{4}X_{n,n+1}+3/2\,X_{n+1}-\frac{1}{4}X_{n+1,n+2}.$$

The thus obtained contour corrected scanning line signal 31 and the contour corrected and interpolated scanning line signal 19 are input to the time base compressor circuits 32 and 33, respectively, wherein these signals are subjected to time base compression to ½ and output therefrom. The switching circuit 34 alternately outputs the output signals of the time base compressor circuits 32 and 33 by switching at intervals of one horizontal scanning period after the time base compression has been made, i.e., one horizontal scanning period in the sequential scanning, or ½ horizontal scanning period in the interlaced scanning.

In the manner as described above, the sequential scanning signal provided with contour correction is obtained at the output terminal 35.

By the way, the time base compressor circuits 32 and 33 can be easily embodied by using, for example, a line memory and arranging such that the read speed of the data will be twice as high as the write speed of the data.

According to the present embodiment, since the contour signal correction processing is performed in parallel for each of the received scanning line signal and the interpolated scanning line signal, the circuit can be easily designed without the need for high speed processing circuits. Further, since the scanning line interpolation signal obtained from the signals within one field by the scanning line interpolation circuit is used as the contour correction signal for the interpolated scanning line signal, it is made possible to reduce the number of line memories, adder circuits, and ¼-time coefficient circuits required for obtaining the contour correction signal.

Incidentally, the response in the direction of the vertical axis of the present invention is expressed as:

$$H(z)=-\frac{1}{4}+3/2Z^{-1}-\frac{1}{4}Z^{-2},$$

where $Z^{-1}$ represents a unit delay time, which is one horizontal scanning period in the sequential scanning. This characteristic is shown in FIG. 3.

Figure 3:
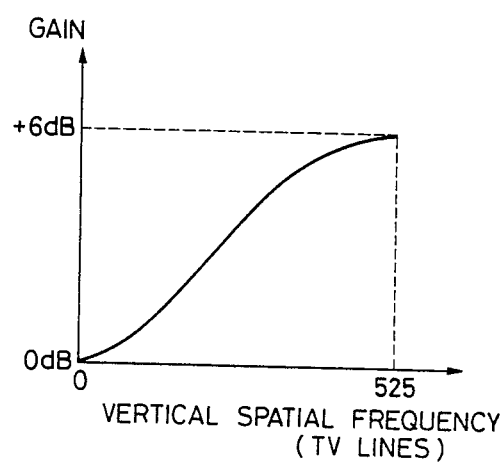
FIG. 3 is a characteristic of the contour signal correction circuit.

As indicated in FIG. 3, the contour signal in the vertical direction of the video signal is corrected by the present invention in which the spatial frequency is improved by a maximum of 6 dB.

Figure 4:
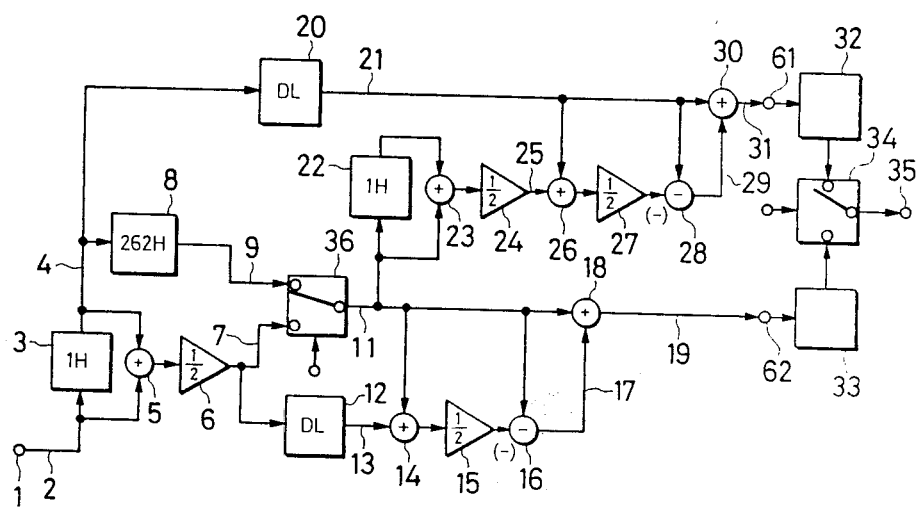
FIGS. 4, 5, and 6 are block diagrams showing other embodiments of the present invention.

FIG. 4 shows a second embodiment of the present invention. In the present embodiment, the mixer circuit 10 in FIG. 1 is replaced with a switching circuit 36. And, in this embodiment, either of interpolation signals 7 and 9 is used selected by the switching circuit 36.

Since the mixer circuit can be omitted in the present embodiment, the overall circuit structure becomes simpler. And this circuit is suited for the apparatus receiving signals having smaller moving picture images. The signal obtained at a terminal 61 is supplied to the time base compressor circuit 32 as shown in FIG. 1, and the signal obtained at a terminal 62 is supplied to the time base compressor circuit 33.

Figure 5:
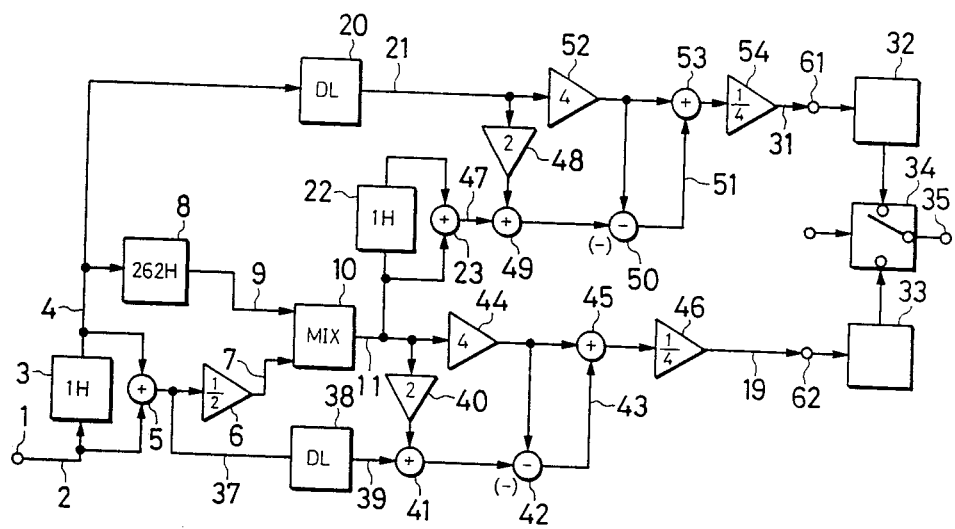

Another embodiment according to the present invention is shown in FIG. 5. Referring to FIG. 5, the circuit of the present embodiment includes a delay circuit 38, 2-time coefficient circuits 40 and 48, adder circuits 41, 45, 49, and 53, subtractor circuits 42 and 50, 4-time coefficient circuits 44 and 52, and ¼-time coefficient circuits 46 and 54.

To accomplish arithmetic operations for correcting the contour signal, the present embodiment is provided with fraction circuits for the results of the operations in the last stage.

First, an interpolated scanning line signal 11 and a contour correction signal 39 for the interpolated scanning line are brought into concurrence by means of the delay circuit 38. The contour correction signal 39 for the interpolated scanning line is added to the signal which is produced by doubling the amplitude of the interpolated scanning line signal 11 by means of the 2-time coefficient circuit 40 in the adder circuit 41.

The interpolated scanning line signal 11, after its amplitude has been multiplied by 4 in the 4-time coefficient circuit 44, and the output signal of the adder circuit 41 are subjected to subtraction in the subtractor circuit 42. The output signal 43 of the subtractor circuit 42 becomes a contour component signal 43. The contour component signal 43 is added to the output signal of the coefficient circuit 44 in the adder circuit 45. The output of the adder circuit 45 is multiplied by ¼ in the 4/1-time coefficient circuit 46, whereby an interpolated and contour corrected scanning line signal 19 is obtained at a terminal 62.

Contour correction of the received scanning line signal is performed in the following manner. First, a contour correction signal 47 for the received scanning line signal and a signal obtained by doubling the amplitude of the actual scanning line signal 21 by means of the 2-time coefficient circuit 48 are added together in the adder circuit 49. Then, the actual scanning line signal 21, after being multiplied by 4 in the 4-time coefficient circuit 52, and the output signal of the adder circuit 49 are subjected to subtraction in the subtractor circuit 50, and in this subtractor circuit 50 is obtained a contour component signal 51. The output signal of the coefficient circuit 52 and the contour component signal 51 are added together in the adder circuit 53. The output signal of the adder circuit 53 is multiplied by ¼ in the ¼-time coefficient circuit 54, whereby a contour corrected scanning line signal 31 is obtained at a terminal 61.

Since the fraction circuits 46 and 54 are arranged in the last stage in the present embodiment, the number of bits of the data handled in the arithmetic operations becomes large, and therefore, the adder circuits 41, 45, 49, and 53 and the subtractor circuits 42 and 50 become somewhat larger in scale than those in the embodiment of FIG. 1. But, in the present case, the rounding errors in the operations become smaller and the contour correction can be performed more accurately. Further, special circuits are not required for the coefficient circuits 40, 44, 48, and 52. When each of the bits of a piece of data are shifted by one bit place to the higher order, the value of the data is doubled, and when they are shifted by two bit places to the higher order, the value of the data is quadrupled.

Figure 6:
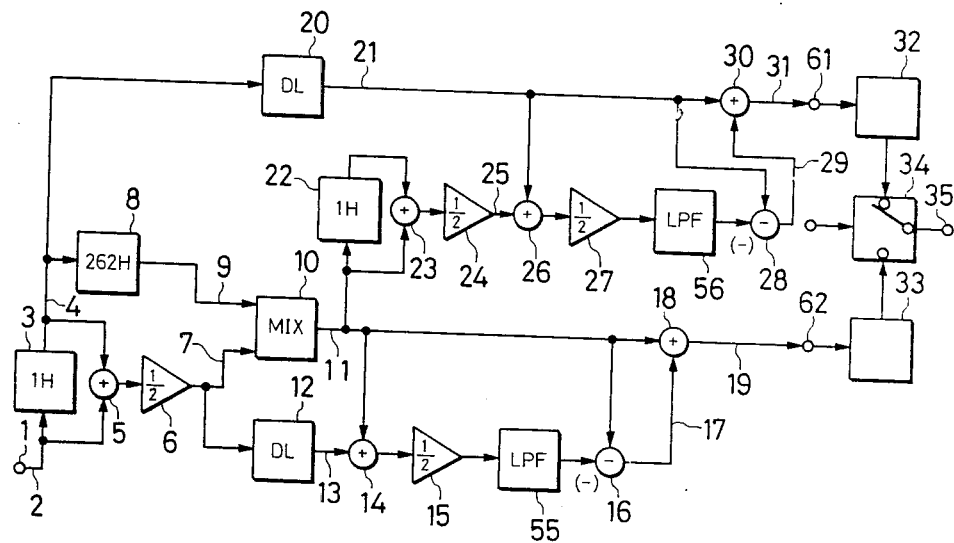

FIG. 6 shows still another embodiment of the present invention. While contour correction only in the direction of the vertical axis has been performed in the embodiments described so far, contour correction in both horizontal direction and vertical direction is performed in the present embodiment.

The circuit of the embodiment shown in FIG. 6 includes one-dimensional low pass filters (LPF) 55 and 56 in the direction of the horizontal axis.

A signal output from a 2/1-time coefficient circuit 15 is input to a one-dimensional LPF 55 in the horizontal direction. The signal output from the one-dimensional LPF 55 is a signal having a two-dimensional low pass filtered characteristic applied with LPF in both vertical axis and horizontal axis. This signal is subtracted from an interpolated scanning line signal 11 in a subtractor circuit 16, and the output signal of the subtractor circuit 16 becomes a signal having a two-dimensional high pass filtered characteristic, and thus, a two-dimensional contour component signal 17 is obtained from the subtractor circuit 16. The two-dimensional contour component signal 17 is added to the interpolated scanning line signal 11 in an adder circuit 18, and thereby, a two-dimensionally contour corrected scanning line signal 19 is obtained at an output terminal 62. Two-dimensional contour correction processing for the actually received scanning line signal 21 is also done in the same way as in the above described two-dimensional contour correction for the interpolated scanning line signal 11, and so, explanation thereof will be omitted here.

In the present embodiment, two-dimensional contour correction is made possible by connecting a one-dimensional LPF in the horizontal direction in series with a one-dimensional LPF in the vertical direction.

According to the present invention, since the contour correction processing is performed in the circuit portions operating at low speed, the contour signal correction circuit can be easily constructed.

And, since the signal required for vertical contour correction is obtained from the scanning line interpolation circuit, the contour signal correction circuit can be constructed relatively simply.

What is claimed is:

1. In combination, a contour signal correction circuit for use in a television receiver and a scanning line interpolation circuit for converting a television signal of a signal structure for interlaced scanning into a television signal for sequential scanning, said scanning line interpolation circuit comprising:
   an input terminal supplied with a digitized video signal of the signal structure for interlaced scanning;
   a first line memory supplied with the video signal received by said input terminal therefrom for delaying the video signal by one horizontal scanning period to produce a first delayed signal;
   first adder means connected with said input terminal and said first line memory and supplied with the received video signal from said input terminal and supplied with the first delayed signal from said line memory for adding together the video signal and the first delayed signal to produce a first added signal including the video signal and the first delayed signal;
   a field memory connected with said first line memory and supplied with the first delayed signal from said first line memory for delaying the first delayed signal by 262 horizontal scanning periods to produce a second delayed signal;
   a mixer circuit connected with said first adder means and said field memory for mixing the first added signal with the second delayed signal to produce an interpolated scanning line signal;
   a first time base compressor circuit supplied with the first delayed signal produced in said first line memory for compressing the time base of the first delayed signal to ½ to produce a compressed first delayed signal;
   a second time base compressor circuit supplied with the interpolated scanning line signal produced in said mixer circuit for compressing the time base of the interpolated scanning line signal to ½ to produce a compressed interpolated scanning line signal; and
   a switching circuit connected with said first and second time base compressor circuits for alternately selecting and outputting the compressed first delayed signal and the compressed interpolated scanning line signal; said contour signal correction circuit comprising:
   a second line memory connected with said mixer circuit and supplied with the interpolated scanning line signal from said mixer circuit for delaying the interpolated scanning line signal by one horizontal scanning period to produce a third delayed signal;
   second adder means connected with said second line memory and said mixer circuit for adding together the third delayed signal and the interpolated scanning line signal to produce a second added signal;
   third adder means supplied with the second added signal from said second adder means and supplied with the first delayed signal from said first line memory for adding together the second added signal and the first delayed signal to produce a third added signal;
   first subtractor means supplied with the third added signal from said third adder means and supplied with the first delayed signal from the first line memory for subtracting the third added signal from the first delayed signal to generate a first subtracted signal;
   fourth adder means connected between said first line memory and said first time base compressor circuit and also connected with said first subtractor means for adding the first subtracted signal to the first delayed signal;

fifth adder means supplied with the first added signal from said first adder means and supplied with the interpolated scanning line signal for adding together the two signals to produce a fifth added signal;

second subtractor means supplied with the fifth added signal from said fifth adder means and supplied with the interpolated scanning line signal from said mixer circuit for subtracting the fifth added signal from the interpolated scanning line signal to produce a second subtracted signal; and sixth adder means connected between said mixer circuit and said second time base compressor circuit and also connected with said second subtractor means for adding the second subtracted signal to the interpolated scanning line signal.

2. In combination, a contour signal correction circuit and a scanning line interpolation circuit according to claim 1, wherein said mixer circuit selects either of the first added signal and the second delayed signal to output the same as the interpolated signal.

3. In combination, a contour signal correction circuit and a scanning line interpolation circuit according to claim 1, wherein said contour signal correction circuit further comprises:

a first low pass filter connected between said third adder means and said first subtractor means for transmitting only low frequency component of the third added signal therethrough; and a second low pass filter connected between said fifth adder means and said second subtractor means for transmitting only low frequency component of the fifth added signal therethrough.

* * * * *